US012083979B2

(12) United States Patent
Nagasawa (10) Patent No.: US 12,083,979 B2
(45) Date of Patent: Sep. 10, 2024

(54) REAR-SEAT AIRBAG AND REAR-SEAT AIRBAG APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/098,888

(22) Filed: Jan. 19, 2023

(65) Prior Publication Data
US 2023/0256927 A1  Aug. 17, 2023

(30) Foreign Application Priority Data

Feb. 17, 2022 (JP) .................................. 2022-023302

(51) Int. Cl.
*B60R 21/20* (2011.01)
*B60N 2/00* (2006.01)
*B60R 21/231* (2011.01)

(52) U.S. Cl.
CPC .............. *B60R 21/20* (2013.01); *B60N 2/002* (2013.01); *B60R 21/231* (2013.01); *B60R 2021/23107* (2013.01); *B60R 2021/23153* (2013.01); *B60R 2021/23169* (2013.01)

(58) Field of Classification Search
CPC ........... B60R 2021/23153; B60R 2021/23169; B60R 2021/23107; B60R 21/20; B60R 21/231; B60R 21/01; B60N 2/002; B60N 2/00

USPC ............. 280/728.1, 728.2, 729, 730.1, 743.1
See application file for complete search history.

(56) References Cited

U.S. PATENT DOCUMENTS

| 5,934,701 A * | 8/1999 | Furukawa | B60R 21/231 280/729 |
| 9,446,731 B1 * | 9/2016 | West | B60R 13/0262 |
| 9,688,232 B1 * | 6/2017 | Loew | B60R 21/231 |
| 11,433,848 B1 * | 9/2022 | Faruque | B60R 21/264 |
| 11,554,739 B1 * | 1/2023 | Jaradi | B60R 21/01512 |
| 2010/0090447 A1 * | 4/2010 | Deng | B60R 21/214 280/751 |

FOREIGN PATENT DOCUMENTS

| CN | 111152748 A | * | 5/2020 | ............. B60R 21/20 |
| FR | 2931420 A1 | * | 11/2009 | ........... B60R 21/231 |
| FR | 2931421 A1 | * | 11/2009 | ........... B60R 21/231 |
| FR | 3102734 A1 | * | 5/2021 | ........... B60R 21/231 |
| GB | 2289242 A | * | 11/1995 | ............. B60R 21/20 |
| JP | 2005-096653 A | | 4/2005 | |
| KR | 19980023670 U | * | 7/1998 | |
| KR | 20050110301 A | * | 11/2005 | |

* cited by examiner

*Primary Examiner* — Keith J Frisby
(74) *Attorney, Agent, or Firm* — MCGINN I.P. LAW GROUP, PLLC.

(57) ABSTRACT

A rear-seat airbag is configured to expand and deploy from a lower portion of a center console of a vehicle toward a center portion of a row of rear seats. A point of intersection of virtual loci of forward movements of a head, a chest, and knees of a passenger sitting in the center portion of the row of rear seats in response to an impact generated by a collision of the vehicle coincides with a center of gravity of the rear-seat airbag when the rear-seat airbag expands and deploys.

20 Claims, 8 Drawing Sheets

REAR-SEAT AIRBAG AND REAR-SEAT AIRBAG APPARATUS

CROSS-REFERENCE TO RELATED APPLICATIONS

The present application claims priority from Japanese Patent Application No. 2022-023302 filed on Feb. 17, 2022, the entire contents of which are hereby incorporated by reference.

BACKGROUND

The disclosure relates to a rear-seat airbag and a rear-seat airbag apparatus.

In general practice, in a vehicle such as an automobile, a collision detector such as an acceleration sensor is disposed at a vehicle body front and detects a collision from ahead of the vehicle. When this collision detector detects a collision from ahead of the vehicle, an airbag apparatus is operated to protect occupants inside a vehicle cabin.

A vehicle with front seats and rear seats is known for including a front-seat airbag apparatus configured to protect occupants sitting in the front seats such as a driver's seat and a front passenger's seat, and a rear-seat airbag apparatus configured to protect passengers sitting in the rear seats disposed at a rear side of the front seats in a vehicle body.

As a rear-seat airbag apparatus of this kind, a rear-seat airbag configured to expand and deploy from a lower portion of a front seat toward a rear side of a backrest of the front seat has been disclosed (see, for example, Japanese Unexamined Patent Application Publication (JP-A) No. 2005-96653). This rear-seat airbag includes: a front expanding portion configured to expand and deploy upward along a rear surface of the backrest; a rear expanding portion configured to expand and deploy rearward from a distal end of the front expanding portion; and a restraint configured to restrain the rear expanding portion to the front expanding portion in such a manner that the rear expanding portion covers upper portions of the thighs of a rear-seat passenger.

Research has been also made on an airbag system configured to deploy from a lap belt that constitutes a seatbelt.

SUMMARY

An aspect of the disclosure provides a rear-seat airbag configured to expand and deploy from a lower portion of a center console of a vehicle toward a center portion of a row of rear seats. A point of intersection of virtual loci of forward movements of a head, a chest, and knees of a passenger sitting in the center portion of the row of rear seats in response to an impact generated by a collision of the vehicle coincides with a center of gravity of the rear-seat airbag when the rear-seat airbag expands and deploys.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

A rear-seat airbag configured to expand and deploy from a lower portion of a front seat toward a rear side of a backrest of the front seat is disclosed in JP-A No. 2005-96653. Such a rear-seat airbag is inapplicable to a center portion of a row of rear seats owing to an original circumstance where no front seat exists in front.

In an airbag system configured to deploy from a lap belt, a seatbelt has such a property of being in a friction environment constantly that humidity, for example, may affect the seatbelt and hinder stable operation of the airbag system.

Moreover, upon occurrence of a collision of a vehicle, the airbag system configured to deploy from the lap belt may be capable of restraining an upper body of a passenger sitting in the center portion of the row of rear seats to some extent. However, the center portion of the row of rear seats is different from the rear seats on opposite sides in that no such structure as a front seat exists to prevent forward movement of a lower body, mainly the knees, of the passenger sitting in the center portion of the row of rear seats. Consequently, a behavior of the upper body of the passenger becomes so unstable that damage to the passenger may be increased.

It is desirable to provide a rear-seat airbag and a rear-seat airbag apparatus for stably restraining a passenger sitting in a center portion of a row of rear seats upon occurrence of a collision of a vehicle.

Referring to FIG. 1 to FIG. 8, a rear-seat airbag apparatus 1 according to an embodiment of the disclosure will be described. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In FIG. 1 to FIG. 6, arrow FR indicates a front side of a vehicle, arrow BK indicates a rear side of the vehicle, arrow UP indicates an upper side of the vehicle, arrow LH indicates a left side of the vehicle (one side of a vehicle width direction) as viewed from the vehicle upper side, and arrow RH indicates a right side of the vehicle (the other side of the vehicle width direction).

In the following description, a vertical direction, a fore-and-aft direction, and a lateral direction are used to respectively indicate a vehicle vertical direction, a vehicle fore-and-aft direction, and a vehicle lateral direction unless specified otherwise.

Embodiment

Referring to FIG. 1 to FIG. 8, a rear-seat airbag apparatus 1 according to an embodiment of the disclosure will be described.

Configuration of Rear-Seat Airbag Apparatus 1

Figure 1:
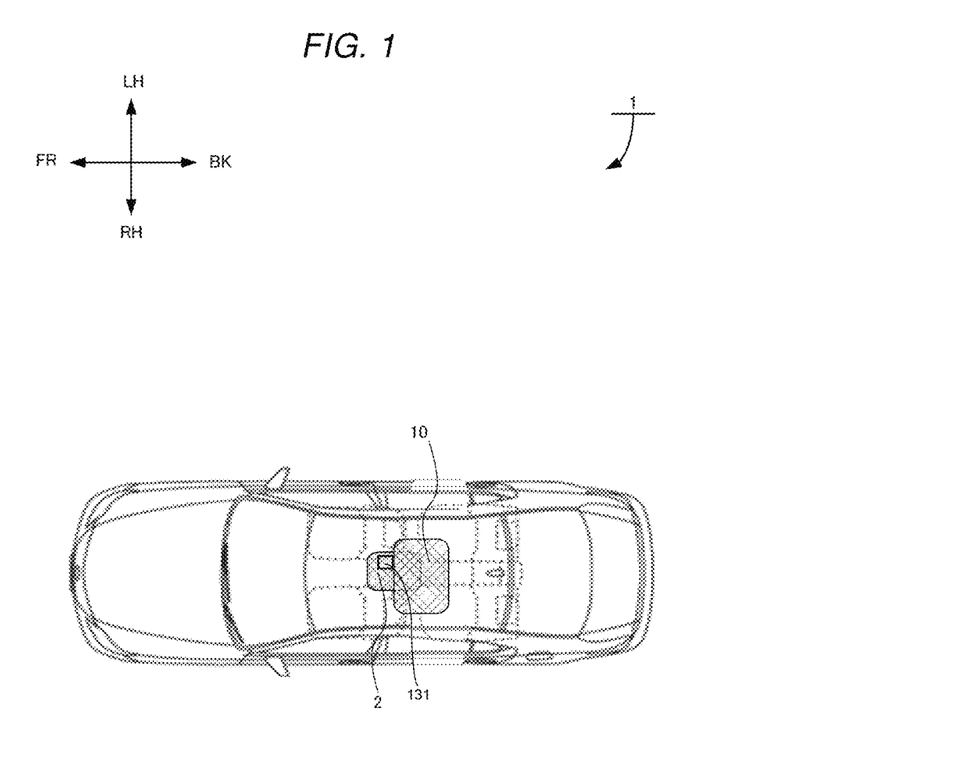
FIG. 1 is a top view of a rear-seat airbag according to an embodiment of the disclosure, illustrating a deployment form thereof.

As illustrated in FIG. 1, a rear-seat airbag 10 of the rear-seat airbag apparatus 1 according to the embodiment is disposed in a lower portion of a center console 2 of the vehicle, and the rear-seat airbag 10 expands and deploys toward a center portion of a row of rear seats.

It is noted that the lower portion of the center console 2 includes a fragile portion, which is to be open when the rear-seat airbag 10 expands and deploys.

Figure 2:
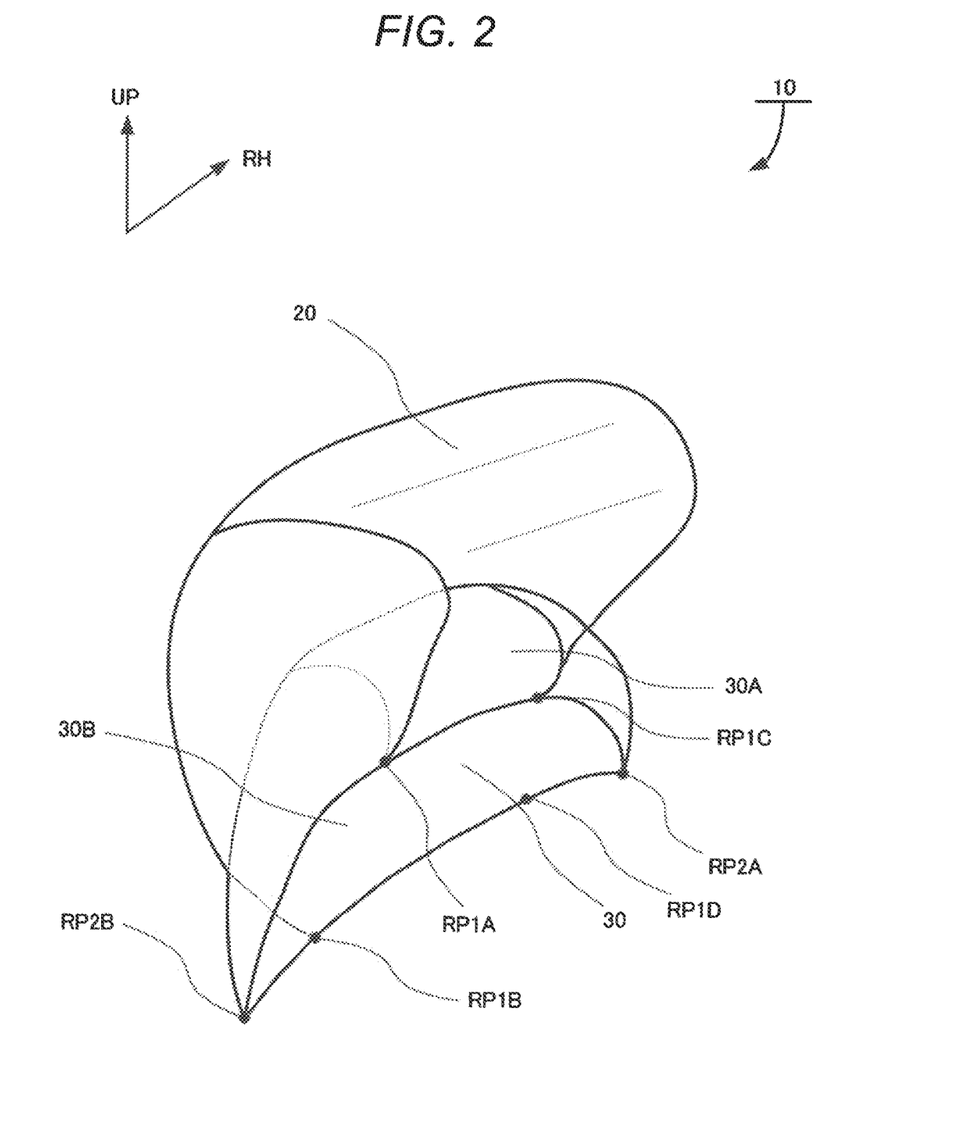
FIG. 2 is a perspective view of the rear-seat airbag according to the embodiment of the disclosure, illustrating a configuration thereof.

As illustrated in FIG. 2, the rear-seat airbag 10 in the rear-seat airbag apparatus 1 according to the embodiment includes a first airbag 20 and a second airbag 30.

The first airbag 20 expands and deploys to restrain an upper body of a passenger CR sitting in a center portion of the row of rear seats.

The first airbag 20 serves as an upper body restraint bag.

The second airbag 30 expands and deploys to restrain a lower body of the passenger CR sitting in the center portion of the row of rear seats. When expanded and deployed, the second airbag 30 takes a deployment form wider in the vertical direction.

Opposite ends RP2A and RP2B of the second airbag 30 in the vehicle width direction are secured at least to a floor stretching over a center portion of the vehicle.

Therefore, the second airbag 30 serves as a lower body restraint bag and as a reaction force bag.

The first airbag 20 includes joints RP1A, RP1B, RP1C, and RP1D, which are four points RP1A, RP1B, RP1C, and RP1D illustrated in FIG. 2, for example, where the first airbag 20 expanded and deployed is coupled to the second airbag 30 expanded and deployed so as to cover a half or more of the second airbag 30.

It is noted that the first airbag 20 is coupled to the second airbag 30 at a plane including the four points of joints RP1A, RP1B, RP1C, and RP1D in such a manner that a line dividing the front-side first airbag 20 and the rear-side second airbag 30 extends until the passenger CR side in a cross section of the first airbag 20 when expanded and deployed.

The second airbag 30 includes cylindrical air chambers 30A and 30B independent from each other in the vertical direction. When the second airbag 30 is expanded and deployed, the cylindrical air chambers 30A and 30B are coupled to each other so as to sandwich and restrain knees KN of the passenger CR.

An inflator, not illustrated, is coupled to the second airbag 30. A region of the second airbag 30 that is coupled to the first airbag 20 has vent holes, not illustrated, via which high-pressure gas supplied from the inflator is discharged to the first airbag 20.

It is noted that diameters of exhaust openings of the vent holes are determined in accordance with a volume of the first airbag 20 and the second airbag 30 and a supply amount of the high-pressure gas supplied from the inflator.

Figure 3:
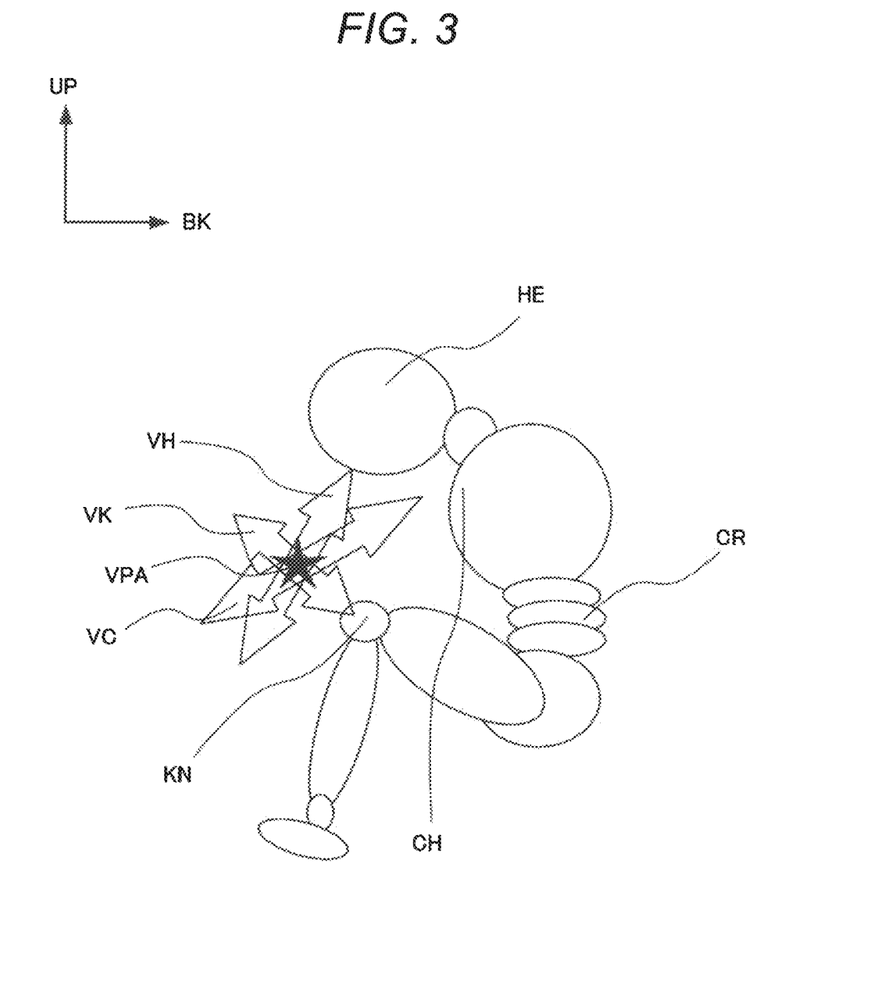
FIG. 3 relates to the rear-seat airbag according to the embodiment of the disclosure and is a diagram illustrating a virtual action point based on virtual loci of forward movements by the head, the chest, and the knees of a passenger upon occurrence of a collision from ahead of a vehicle.

In response to an impact generated by a collision of the vehicle, the head HE, the chest CH, and the knees KN of the passenger CR sitting in the center portion of the row of rear seats move forward. When the rear-seat airbag 10 expands and deploys, a point of intersection of virtual loci of these forward movements coincides with a center of gravity of the rear-seat airbag 10.

In FIG. 3, arrows (vectors) illustrate the virtual loci of the forward movements of the head HE, the chest CH, and the knees KN of the passenger CR sitting in the center portion of the row of rear seats in response to the impact generated by the collision of the vehicle during expansion and deployment of the rear-seat airbag 10.

In FIG. 3, arrow VH indicates the virtual locus of the head HE of the passenger CR, arrow VC indicates the virtual locus of the chest CH of the passenger CR, and arrow VK indicates the virtual locus of the knees KN of the passenger CR.

Figure 4:
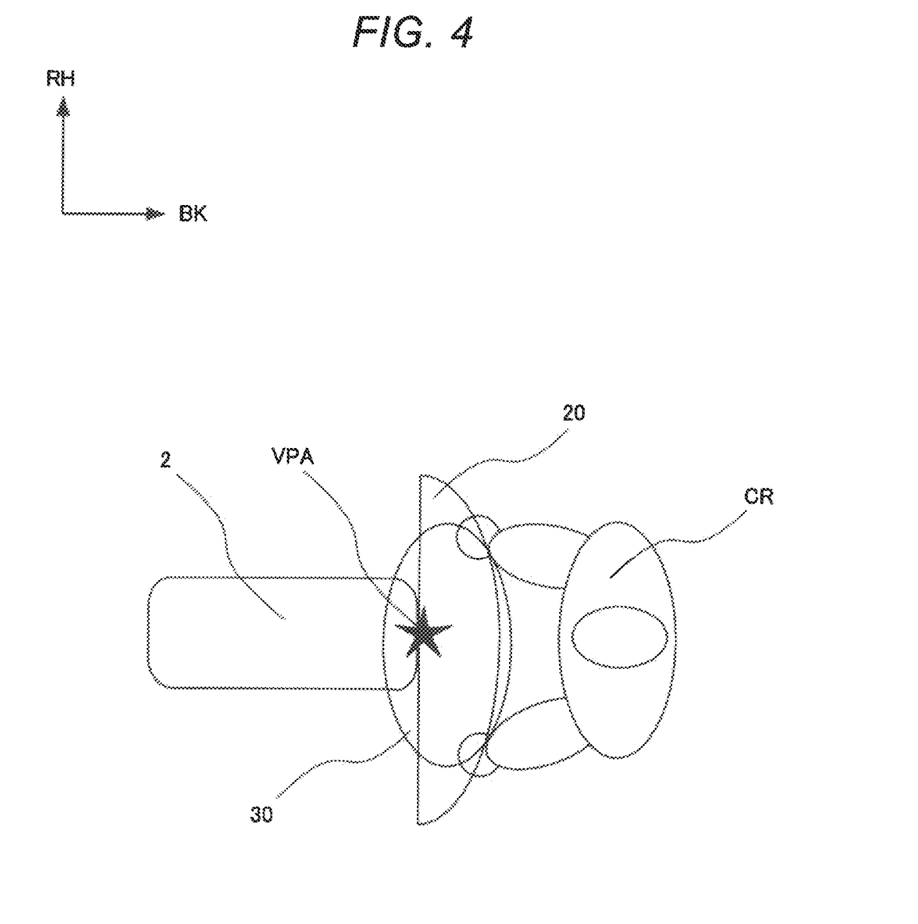
FIG. 4 relates to the rear-seat airbag according to the embodiment of the disclosure and is a diagram illustrating a relationship of the passenger, a center console, and the virtual action point immediately after occurrence of the collision from ahead of the vehicle.

That is, as illustrated in FIG. 4, a disposition location and a deployment form of the rear-seat airbag 10 are determined in such a manner that an intersection point VPA of these virtual loci coincides with the center of gravity of the rear-seat airbag 10 when expanded and deployed.

Moreover, the first airbag 20 includes a protrusion CP configured to expand and deploy above the intersection point VPA of the virtual loci when the first airbag 20 expands and deploys.

Figure 5:
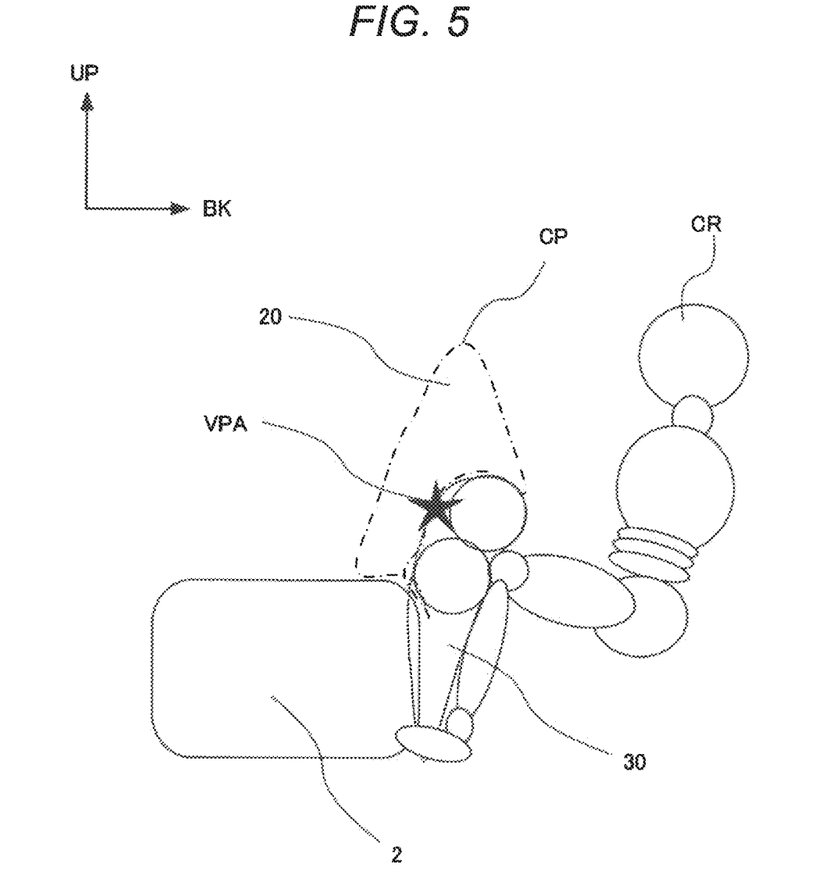
FIG. 5 is a diagram illustrating a relationship between a deployment form of the rear-seat airbag according to the embodiment of the disclosure and the passenger.

In one example, as illustrated in FIG. 5, when the first airbag 20 and the second airbag 30 expand and deploy, the first airbag 20 expands and deploys in such a manner that the protrusion CP is formed above the intersection point VPA of the virtual loci.

Figure 6:
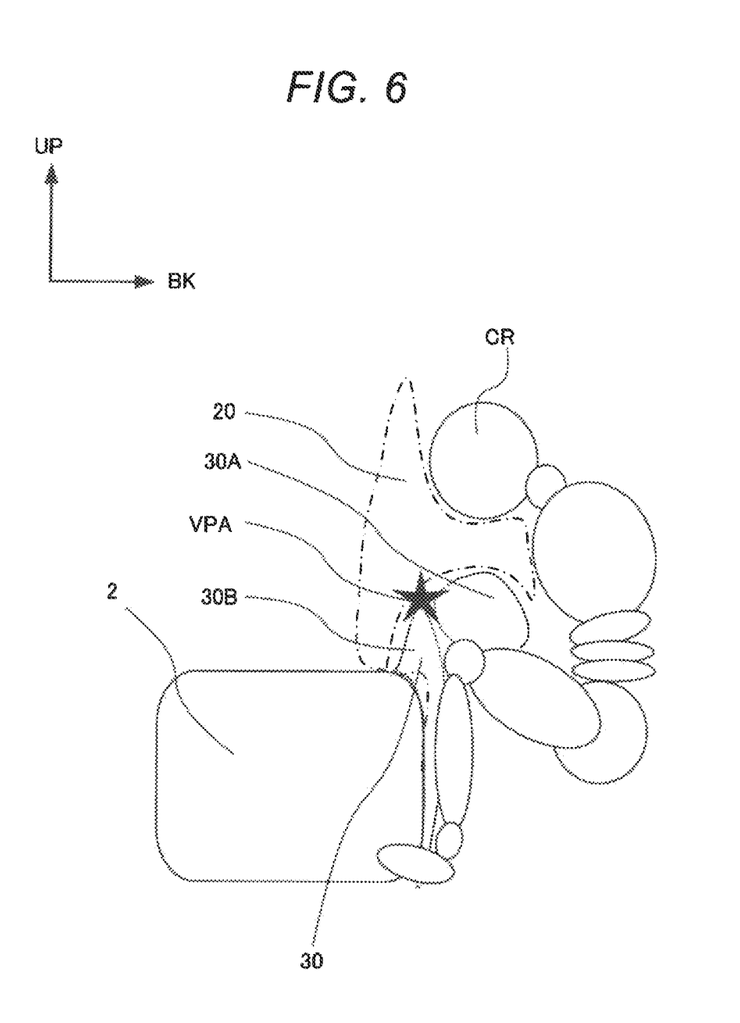
FIG. 6 relates to the rear-seat airbag according to the embodiment of the disclosure and is a diagram illustrating the passenger moving forward in the vehicle and the deployment form after occurrence of the collision from ahead of the vehicle.

Furthermore, as illustrated in FIG. 6, upon occurrence of the collision from ahead of the vehicle, when the passenger CR falls forward in the vehicle, the second airbag 30 expands and deploys in such a manner that the intersection point VPA of the virtual loci intersects a center portion of the two cylindrical air chambers 30A and 30B coupled to each other in the vertical direction.

Electrical Configuration of Rear-Seat Airbag Apparatus 1

Figure 7:
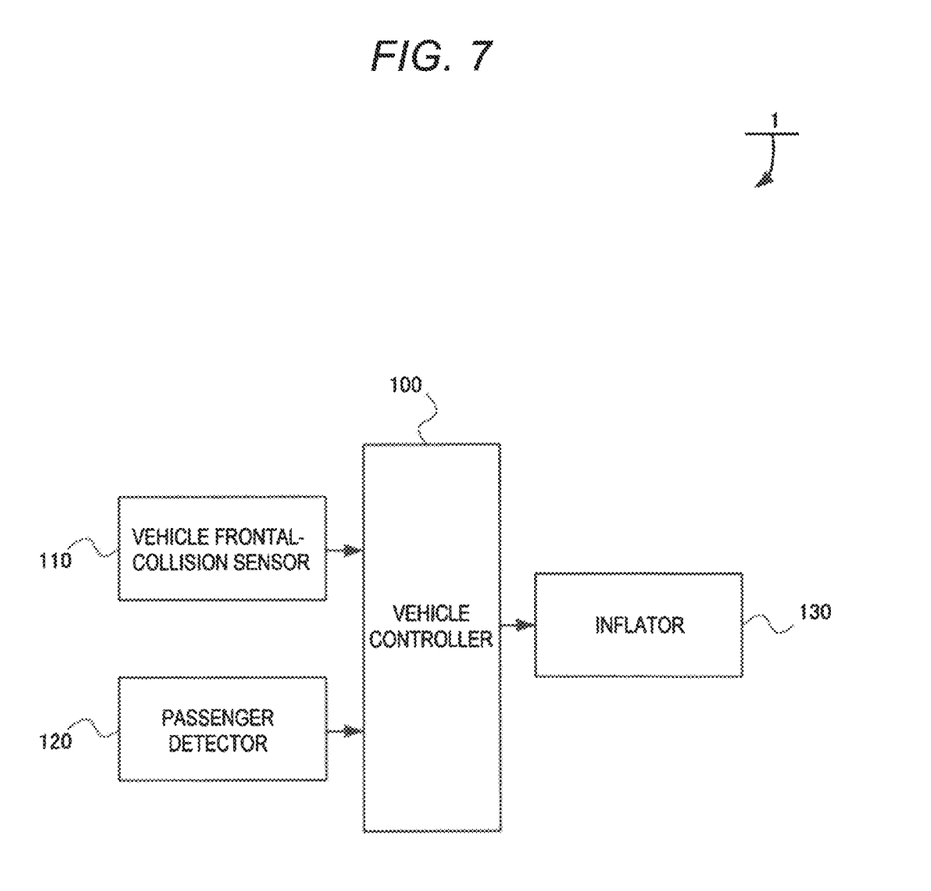
FIG. 7 is a block diagram illustrating an electrical configuration of a rear-seat airbag apparatus according to the embodiment of the disclosure.

Referring to FIG. 7, an electrical configuration of the rear-seat airbag apparatus 1 according to the embodiment will be described.

As illustrated in FIG. 7, the rear-seat airbag apparatus 1 includes a vehicle controller 100, a vehicle frontal-collision sensor 110, a passenger detector 120, and an inflator 130.

The vehicle controller 100 includes components such as a central processing unit (CPU), a read only memory (ROM), and a random access memory (RAM). The vehicle controller 100 is an electronic control unit (ECU) configured to perform, for example, various kinds of arithmetic processing for vehicle control.

It is noted that in the embodiment, the vehicle controller 100 controls operation of the inflator 130 based on a sensing signal from the vehicle frontal-collision sensor 110, described later.

When a collision from ahead of the vehicle occurs, the vehicle frontal-collision sensor 110 outputs to the vehicle controller 100 a sensing signal to the effect that the collision has been detected.

In one example, the vehicle frontal-collision sensor 110 may be an acceleration sensor configured to detect an impact or vibration applied to the vehicle as an acceleration.

The acceleration sensor may be a piezo-resistive acceleration sensor utilizing a change in electrical resistance of a semiconductor or an electrostatic capacity acceleration sensor configured to detect a gap change between a movable part and a stationary part of a comb electrode as an electrostatic capacity.

Alternatively, the acceleration sensor configured to detect a collision and another acceleration sensor configured to detect an acceleration of a floor may be provided to determine the collision based on acceleration values from both of the acceleration sensors.

The passenger detector 120 detects the passenger CR sitting in the center portion of the row of rear seats.

The passenger detector 120 may be a load sensor disposed inside a seat surface of the row of rear seats or a detection method such as a method of analyzing a captured image of an inside of a vehicle cabin.

The case 131 including inflator 130 is disposed in the lower portion of the center console 2, and includes the rear-seat airbag 10 folded, an ignition device, an ignition agent, a gas generation agent, and a container box configured to contain these components.

In the inflator 130, when the ignition device is started in response to a control signal from the vehicle controller 100, the ignition agent catches fire to generate a large amount of gas, which is supplied via the first airbag 20 and the vent holes that constitute the rear-seat airbag 10 so as to expand and deploy the second airbag 30.

Control of Rear-Seat Airbag Apparatus 1

Figure 8:
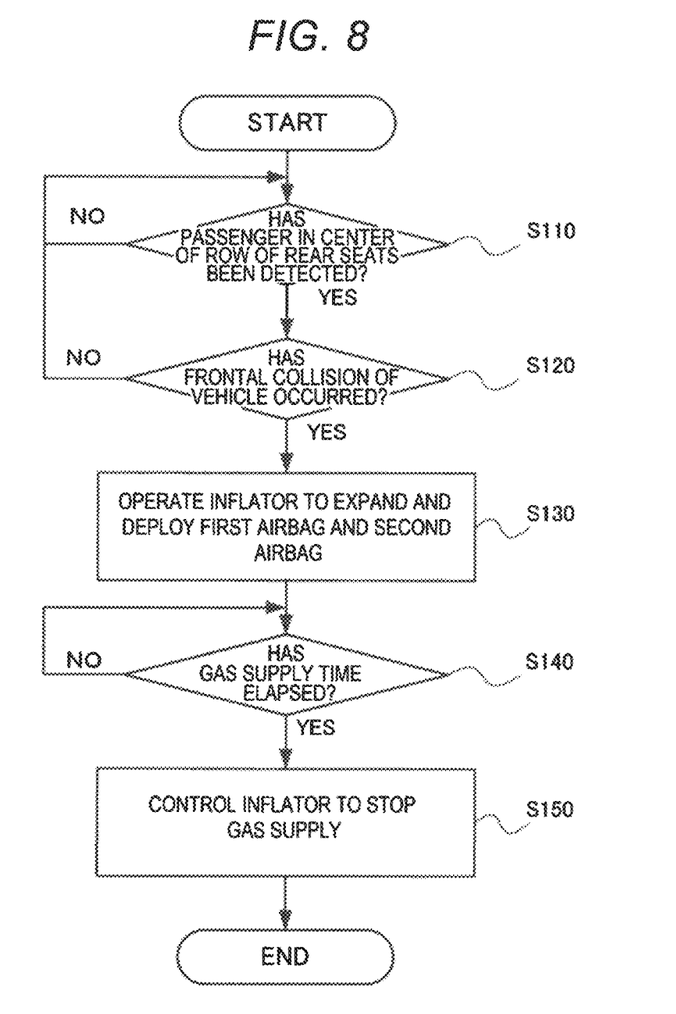
FIG. 8 is a flowchart of a process flow by a vehicle controller of the rear-seat airbag apparatus according to the embodiment of the disclosure.

As illustrated in FIG. 8, the vehicle controller 100 determines whether the passenger CR in the center portion of the row of rear seats has been detected (step S110). In one example, the vehicle controller 100 determines whether the vehicle controller 100 has received, from the passenger detector 120, a signal to the effect that the passenger CR in the center portion of the row of rear seats has been detected.

When the vehicle controller 100 detects the passenger CR in the center portion of the row of rear seats ("YES" at step S110), the vehicle controller 100 makes the process proceed to step S120.

Unless the vehicle controller 100 detects the passenger CR in the center portion of the row of rear seats ("NO" at step S110), the vehicle controller 100 resets the process and stands by.

Next, the vehicle controller 100 determines whether a collision has occurred at the vehicle front (step S120).

At this time, when the vehicle controller 100 determines that no collision has occurred at the vehicle front, that is, when the vehicle controller 100 determines that the vehicle controller 100 has received no sensing signal from the vehicle frontal-collision sensor 110 ("NO" at step S120), the vehicle controller 100 returns the process to step S110.

When the vehicle controller 100 determines that a collision has occurred at the vehicle front ("YES" at step S120), for example, when the vehicle controller 100 determines that the vehicle controller 100 has received, from the vehicle frontal-collision sensor 110, the sensing signal to the effect that a collision has occurred at the vehicle front, the vehicle controller 100 performs control to operate the inflator 130 so as to expand and deploy the first airbag 20 and the second airbag 30 (step S130).

Next, the vehicle controller 100 determines whether predetermined time of gas supply by the inflator 130 has elapsed (step S140).

When the vehicle controller 100 determines that the predetermined time of gas supply by the inflator 130 has not elapsed ("NO" at step S140), the vehicle controller 100 resets the process and stands by.

At this step, the predetermined time refers to, for example, a period of time for supplying a sufficient amount of gas to expand and deploy the first airbag 20 and the second airbag 30.

When the vehicle controller 100 determines that the predetermined time of gas supply by the inflator 130 has elapsed ("YES" at step S140), the vehicle controller 100 controls the inflator 130 to stop gas supply by the inflator 130 (step S150), and ends the process.

Operation and Effect

As described above, the rear-seat airbag 10 of the rear-seat airbag apparatus 1 according to the embodiment expands and deploys from the lower portion of the center console 2 of the vehicle toward the center portion of the row of rear seats. The rear-seat airbag 10 includes the first airbag 20 that restrains the upper body of the passenger CR sitting in the center portion of the row of rear seats, and the second airbag 30 that restrains the lower body of the passenger CR sitting in the center portion of the row of rear seats.

That is, the first airbag 20 restrains the upper body of the passenger CR sitting in the center portion of the row of rear seats so as to serve as the upper body restraint bag. The second airbag 30 restrains the lower body of the passenger CR sitting in the center portion of the row of rear seats so as to serve as the lower body restraint bag.

Consequently, the rear-seat airbag 10 of the rear-seat airbag apparatus 1 serves both as the upper body restraint airbag and as the lower body restraint airbag so that the passenger CR in the row of rear seats can be stably restrained upon occurrence of the collision of the vehicle.

Moreover, because the rear-seat airbag 10 of the rear-seat airbag apparatus 1 expands and deploys from the lower portion of the center console 2 of the vehicle toward the center portion of the row of rear seats, even the passenger CR in the center portion of the row of rear seats can be stably restrained upon occurrence of the collision of the vehicle though no front seat exists in front of the center portion of the row of rear seats.

When the second airbag 30 that constitutes the rear-seat airbag 10 of the rear-seat airbag apparatus 1 according to the embodiment is expanded and deployed, the cylindrical air chambers 30A and 30B independent from each other in the vertical direction are expanded and deployed while coupled to each other, and at least opposite ends of the cylindrical air chambers 30A and 30B in the vehicle width direction are secured to the securing points RP2A and RP2B in the floor stretching over the center portion of the vehicle.

That is, at least the opposite ends of the second airbag 30 in the vehicle width direction are secured to the securing points RP2A and RP2B in the floor stretching over the center portion of the vehicle.

Consequently, the second airbag 30 serves both as the lower body restraint bag and as the reaction force bag so that the passenger CR in the row of rear seats can be stably restrained upon occurrence of the collision of the vehicle.

The first airbag 20 that constitutes the rear-seat airbag 10 of the rear-seat airbag apparatus 1 according to the embodiment includes the joints RP1A, RP1B, RP1C, and RP1D where the first airbag 20 expanded and deployed is coupled to the second airbag 30 expanded and deployed so as to cover a half or more of the second airbag 30.

Therefore, for example, when the first airbag 20 and the second airbag 30 are coupled to each other at the joints, which are the four points RP1A, RP1B, RP1C, and RP1D, and even when the force generated by the collision of the vehicle is applied to the passenger CR sitting in the center portion of the row of rear seats and makes the upper body of the passenger CR fall forward in the vehicle, thereby applying pressure to the first airbag 20, the joints RP1A, RP1B, RP1C, and RP1D enable the second airbag 30 to provide reaction force. Thus, upon occurrence of the collision of the vehicle, the upper body and the lower body of the passenger CR in the row of rear seats can be stably restrained.

Moreover, when the first airbag 20 and the second airbag 30 are coupled to each other at the plane including the four points of the joints RP1A, RP1B, RP1C, and RP1D, a coupling state of the first airbag 20 and the second airbag 30 is strengthened. Consequently, even when the force generated by the collision of the vehicle is applied to the passenger CR sitting in the center portion of the row of rear seats and makes the upper body of the passenger CR fall forward in the vehicle, thereby applying pressure to the first airbag 20, the coupling at the plane including the joints RP1A, RP1B, RP1C, and RP1D enables the second airbag 30 to provide reaction force. Thus, upon occurrence of the collision of the vehicle, the upper body and the lower body of the passenger CR in the row of rear seats can be restrained more stably.

The rear-seat airbag 10 of the rear-seat airbag apparatus 1 according to the embodiment expands and deploys in such a manner that when the head HE, the chest CH, and the knees KN of the passenger CR sitting in the center portion of the row of rear seats move forward in response to an impact generated by the collision of the vehicle, the point of intersection of the virtual loci of these forward movements coincides with the center of gravity of the rear-seat airbag 10.

That is, the center of gravity of the rear-seat airbag 10 when expanded and deployed coincides with the point of intersection of the virtual loci of the forward movements of the head HE, the chest CH, and the knees KN of the passenger CR sitting in the center portion of the row of rear seats in response to the impact generated by the collision of the vehicle.

Consequently, with respect to such moving forward behaviors by the head HE, the chest CH, and the knees KN of the passenger CR sitting in the center portion of the row of rear seats owing to the impact generated by the collision of the vehicle, the first airbag 20 and the second airbag 30 are deployed while uniformly disposed.

Therefore, upon occurrence of the collision of the vehicle, the passenger CR sitting in the center portion of the row of rear seats can be stably restrained.

When expanded and deployed, the first airbag 20 that constitutes the rear-seat airbag 10 of the rear-seat airbag apparatus 1 according to the embodiment has the protrusion CP expanded and deployed above the point of intersection of the virtual loci.

That is, the first airbag 20 expands and deploys in such a manner that the protrusion CP filled with sufficient high-pressure gas is formed above the point of intersection of the virtual loci.

Consequently, as the head HE, the chest CH, and the knees KN of the passenger CR sitting in the center portion of the row of rear seats move forward due to the impact generated by the collision of the vehicle, the protrusion CP filled with sufficient high-pressure gas first enfolds and restrains the head HE of the passenger CR, and then, part of the protrusion CP that has been deformed by the restraint enfolds and restrains the chest CH of the passenger CR.

Therefore, upon occurrence of the collision of the vehicle, the upper body of the passenger CR sitting in the center portion of the row of rear seats can be stably restrained.

Moreover, upon occurrence of the collision from ahead of the vehicle, when the passenger CR falls forward in the vehicle, the second airbag 30 that constitutes the rear-seat airbag 10 of the rear-seat airbag apparatus 1 according to the embodiment expands and deploys in such a manner that the intersection point of the virtual loci intersects the center portion of the cylindrical air chambers 30A and 30B coupled to each other in the vertical direction.

That is, the second airbag 30 expands and deploys to make the intersection point of the virtual loci intersect the center portion of the cylindrical air chambers 30A and 30B coupled to each other in the vertical direction so that the second airbag 30 is disposed uniformly with respect to the knees KN of the passenger CR sitting in the center portion of the row of rear seats.

Therefore, upon occurrence of the collision of the vehicle, the lower body of the passenger CR sitting in the center portion of the row of rear seats can be stably restrained.

Furthermore, when the second airbag 30 expands and deploys to make the intersection point of the virtual loci intersect the center portion of the cylindrical air chambers 30A and 30B coupled to each other in the vertical direction, a joint of the cylindrical air chambers 30A and 30B contacts the front of the knees KN of the passenger CR, an expansion of the upper cylindrical air chamber 30A contacts leg parts of the passenger CR above the knees KN, and an expansion of the lower cylindrical air chamber 30B contacts leg parts of the passenger CR below the knees KN. Thus, upon occurrence of the collision of the vehicle, the knees KN of the passenger CR sitting in the center portion of the row of rear seats can be restrained stably from three directions.

When the vehicle controller 100 of the rear-seat airbag apparatus 1 according to the embodiment receives, from the passenger detector 120, the signal to the effect that the passenger detector 120 has detected the passenger CR in the center portion of the row of rear seats, and when the vehicle controller 100 determines that the collision has occurred at the vehicle front, the vehicle controller 100 performs control to operate the inflator 130 so as to expand and deploy the first airbag 20 and the second airbag 30.

That is, generally, the passenger CR sits in the rear seat of the vehicle less frequently than the passenger CR sits in the front passenger's seat of the vehicle, and the passenger CR sits in the center portion of the row of rear seats even less frequently.

For this reason, when the signal to the effect that the passenger CR in the center portion of the row of the rear seats has been detected is received from the passenger detector 120, and when it is determined that the collision has occurred at the vehicle front, control is performed to operate the inflator 130 so as to expand and deploy the first airbag 20 and the second airbag 30.

First Modified Example

In the description of the embodiment, the second airbag 30 includes the two cylindrical air chambers 30A and 30B coupled to each other.

However, this is not to be construed in a limiting sense. For example, the second airbag 30 may include three cylindrical air chambers coupled to one another.

In this case, an upper cylindrical air chamber in the vertical direction contacts the leg parts of the passenger CR above the knees KN, a lower cylindrical air chamber contacts the leg parts of the passenger CR below the knees KN, and an intermediate cylindrical air chamber contacts the front of the knees KN of the passenger CR. Thus, upon occurrence of the collision of the vehicle, the knees KN of the passenger CR sitting in the center portion of the row of rear seats can be restrained stably from three directions.

Second Modified Example

In the description of the embodiment, when the passenger detector 120 fails to detect the passenger CR sitting in the center portion of the row of rear seats, the rear-seat airbag 10 is not expanded and deployed.

However, when airbags are provided for the rear seats on opposite sides, the rear-seat airbag 10 may be expanded and deployed even when the passenger detector 120 fails to detect the passenger CR sitting in the center portion of the row of rear seats.

That is, without having detected the passenger CR sitting in the center portion of the row of rear seats, the rear-seat airbag 10 is expanded and deployed. Thus, upon occurrence of a collision from diagonally ahead of the vehicle, for example, when passengers CR sitting in the rear seats on opposite sides exhibit yawing behaviors, the first airbag 20 expanded and deployed is present in loci of the yawing behaviors so as to restrain upper bodies of the passengers CR.

It is noted that the rear-seat airbag apparatus 1 according to the embodiment of the disclosure can be implemented by recording the process by the vehicle controller 100 on the recording medium readable by the computer system, and by causing the vehicle controller 100 to read the program recorded on the recording medium and execute the program. The computer system in this description includes an OS and hardware such as peripheral devices.

The "computer system" also includes a homepage providing environment (or display environment) when the World Wide Web (WWW) system is used. The program may be transmitted from the computer system with the program stored in a storage, for example, to another computer system via a transmission medium or by a transmission wave in the transmission medium. In this description, the "transmission medium" configured to transmit the program refers to a medium serving to transmit information, for example, a network (communication network) such as the Internet or a communication line such as a telephone line.

The program may serve to implement some of the above-described functions. Furthermore, the program may be what is called a difference file (difference program), with which the program already recorded on the computer system can be combined to implement the functions.

Although the embodiment of the disclosure has been described in detail heretofore with reference to the drawings, configuration examples are not to be limited to the embodiment but may include designs, for example, within the scope of the subject matter of the disclosure.

The invention claimed is:

1. A rear-seat airbag configured to expand and deploy from a lower portion of a center console of a vehicle toward a center portion of a row of rear seats,
wherein the rear-seat airbag is configured to when the rear-seat airbag expands and deploys to provide a point of intersection of virtual loci of forward movements of a head, a chest, and knees of a passenger sitting in the center portion of the row of rear seats in response to an impact generated by a collision of the vehicle that coincides with a center of gravity of the rear-seat airbag.

2. The rear-seat airbag according to claim 1, wherein
when the rear-seat airbag expands and deploys, cylindrical air chambers independent from each other in a vertical direction expand and deploy while coupled to each other, and
at least both ends of each of the cylindrical air chambers in a vehicle width direction are secured to a floor stretching over a center portion of the vehicle.

3. The rear-seat airbag according to claim 2, wherein the rear-seat airbag expands and deploys such that the intersection point of the virtual loci intersects a center portion of the cylindrical air chambers.

4. A rear-seat airbag apparatus comprising:
a case;
the rear-seat airbag according to claim 1; and
an inflator, wherein
the case contains the rear-seat airbag and the inflator,
the case is disposed in the lower portion of the center console, and
the inflator is configured to operate based on the impact applied to the vehicle so as to expand and deploy the rear-seat airbag.

5. The rear-seat airbag apparatus according to claim 4, further comprising:
a passenger detector configured to detect the passenger sitting in the center portion of the row of rear seats, wherein
when the impact is applied to the vehicle and the passenger detector detects the passenger sitting in the center portion of the row of rear seats, the inflator operates to expand and deploy the rear-seat airbag.

6. A rear-seat airbag apparatus comprising:
a case;
the rear-seat airbag according to claim 2; and
an inflator, wherein
the case contains the rear-seat airbag and the inflator,
the case is disposed in the lower portion of the center console, and
the inflator is configured to operate based on the impact applied to the vehicle so as to expand and deploy the rear-seat airbag.

7. The rear-seat airbag apparatus according to claim 6, further comprising:
a passenger detector configured to detect the passenger sitting in the center portion of the row of rear seats, wherein
when the impact is applied to the vehicle and the passenger detector detects the passenger sitting in the center portion of the row of rear seats, the inflator operates to expand and deploy the rear-seat airbag.

8. A rear-seat airbag apparatus, comprising:
the rear-seat airbag according to claim 1; and
a controller configured to determine whether the passenger in the center portion of the row of rear seats has been detected.

9. The rear-seat airbag apparatus according to claim 8, wherein the controller is configured to control the rear-seat airbag when the rear-seat airbag expands and deploys to provide the point of intersection of virtual loci of forward movements of the head, the chest, and knees of the passenger sitting in the center portion of the row of rear seats in response to the impact generated by a collision of the vehicle that coincides with a center of gravity of the rear-seat airbag.

10. A vehicle, comprising the rear-seat airbag apparatus according to claim 9.

11. The rear-seat airbag according to claim 1, further comprising a protrusion expanded and deployed above the point of intersection of the virtual loci.

12. The rear-seat airbag according to claim 1, wherein the rear-seat airbag expands and deploys such that the intersection point of the virtual loci intersects a center portion of cylindrical air chambers that are coupled to each other.

13. A rear-seat airbag configured to expand and deploy from a lower portion of a center console of a vehicle toward a center portion of a row of rear seats, the rear-seat airbag comprising:
a first airbag;
a second airbag connected to the first airbag and disposed below the first airbag;
wherein the first airbag and the second airbag are configured to when the rear-seat airbag expands and deploys to provide a point of intersection of virtual loci of forward movements of a head, a chest, and knees of a passenger sitting in the center portion of the row of rear seats in response to an impact generated by a collision of the vehicle that coincides with a center of gravity of the rear-seat airbag.

14. The rear-seat airbag according to claim 13, wherein when the rear-seat airbag expands and deploys, cylindrical air chambers independent from each other in a vertical direction expand and deploy while coupled to each other, and
at least both ends of each of the cylindrical air chambers in a vehicle width direction are secured to a floor stretching over a center portion of the vehicle.

15. A rear-seat airbag apparatus comprising:
a case;
the rear-seat airbag according to claim 13; and
an inflator, wherein
the case contains the rear-seat airbag and the inflator,
the case is disposed in the lower portion of the center console, and
the inflator is configured to operate based on the impact applied to the vehicle so as to expand and deploy the rear-seat airbag.

16. The rear-seat airbag apparatus according to claim 15, further comprising:
a passenger detector configured to detect the passenger sitting in the center portion of the row of rear seats, wherein
when the impact is applied to the vehicle and the passenger detector detects the passenger sitting in the center portion of the row of rear seats, the inflator operates to expand and deploy the rear-seat airbag.

17. A rear-seat airbag apparatus comprising:
a case;
the rear-seat airbag according to claim 14; and
an inflator, wherein
the case contains the rear-seat airbag and the inflator,
the case is disposed in the lower portion of the center console, and
the inflator is configured to operate based on the impact applied to the vehicle so as to expand and deploy the rear-seat airbag.

18. The rear-seat airbag apparatus according to claim 17, further comprising:
a passenger detector configured to detect the passenger sitting in the center portion of the row of rear seats, wherein
when the impact is applied to the vehicle and the passenger detector detects the passenger sitting in the center portion of the row of rear seats, the inflator operates to expand and deploy the rear-seat airbag.

19. A rear-seat airbag apparatus, comprising:
the rear-seat airbag according to claim 13; and
a controller configured to determine whether the passenger in the center portion of the row of rear seats has been detected.

20. A vehicle, comprising the rear-seat airbag apparatus according to claim 19.

* * * * *